Sept. 23, 1941.  H. G. LUBSZYNSKI ET AL  2,256,523
ELECTRON MULTIPLIER
Filed July 29, 1938
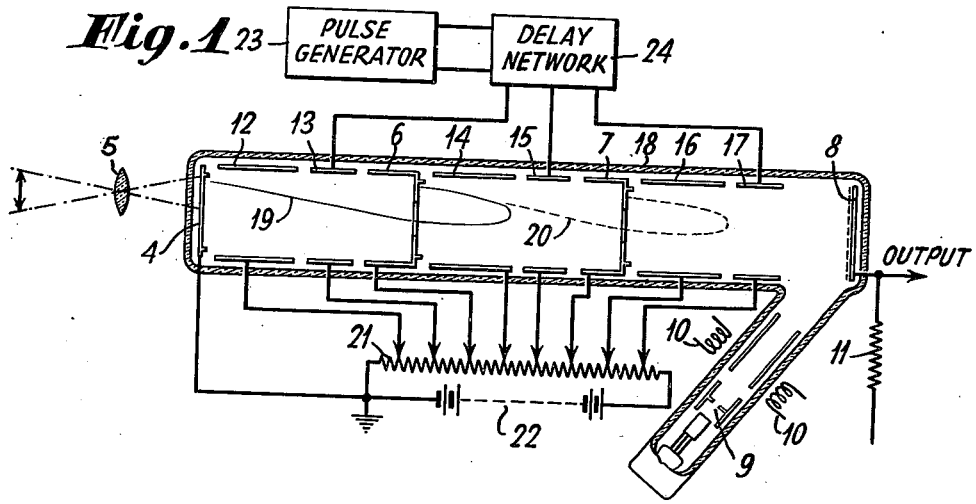
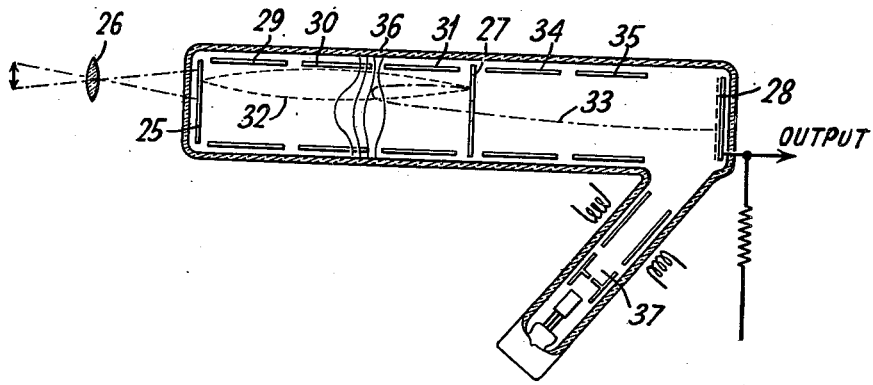
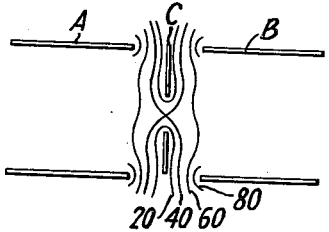
INVENTORS
H. G. LUBSZYNSKI
W. S. BROWN
BY
ATTORNEY

UNITED STATES PATENT OFFICE 2,256,523

ELECTRON MULTIPLIER

Hans Gerhard Lubszynski, Hillingdon, and William Stewart Brown, London, England, assignors to Electric & Musical Industries Limited, Hayes, Middlesex, England, a company of Great Britain Application July 29, 1938, Serial No. 221,898
In Great Britain August 5, 1937

11 Claims. (Cl. 178—7.2)

This invention relates to electron multipliers and is concerned with the type of apparatus referred to as picture amplifiers or multipliers as distinct from a large number of other electron multipliers which merely serve to amplify a beam of electrons emanating from a spot rather than the amplification of an electron image of an object.

In picture multipliers it has been proposed to project on a photo-electric cathode an optical image of a subject for example, during television transmission, the photo-electrons emanating from the cathode being accelerated towards and caused to impinge on a secondary electron emitting grid which emits secondary electrons in greater number than that of the incident photo-electrons, the secondary electrons being accelerated from the said grid and focussed on to a further grid, if required, the tertiary electrons then being projected on a mosaic screen. In some cases the mosaic screen may be replaced by a fluorescent screen. Such an arrangement, however, suffers from the disadvantage that the resultant picture loses a certain amount of detail owing to the finite structure of the grids. In a further proposal for a picture multiplier, it has been suggested to project an electron image onto a "plain" or continuous secondary emitting surface and to focus the secondary electrons onto a mosaic screen or onto a fluorescent screen. In this arrangement, however, it is necessary to project the electron image obliquely onto the secondary emitting surface which presents difficulties in maintaining proper focus of the electrons on the secondary emitting surface. The general arrangement of the former proposal is more advantageous since it is possible with such a construction to arrange the photo sensitive cathode and the final screen and the secondary emitting grids parallel to one another, whilst the various accelerating electrodes can be arranged co-axially.

It is the object of the present invention to provide an improved method and apparatus for amplifying an electron image in which the difficulty due to the finite structure of grids is avoided and in which it is possible to arrange the various elements of the amplifier co-axially.

According to the present invention a method of amplifying an electron image of an object is provided which comprises projecting the electron image onto a plain secondary electron emitting electrode with a velocity such as to cause the liberation of a greater number of secondary electrons than the number of incident primary electrons and employing an electron mirror for the purpose of changing the trajectories of the electrons so as to cause them to move in a desired path.

According to one specific form of the invention a method of amplifying an electron image of an object is provided which comprises projecting the electron image past a plain secondary electron emitting electrode, producing an electron mirror and reflecting the electron image back onto the surface of the secondary emitting electrode with a velocity such as to cause the liberation of a greater number of secondary electrons than incident primary electrons, removing the electron mirror and subjecting the released secondary electrons to the action of an electron lens whereby the secondary electrons are accelerated and focussed onto a further electrode.

According to another specific embodiment of the invention a method of amplifying an electron image of an object is provided which comprises projecting the electron image onto a plain secondary electron emitting electrode with a velocity such as to cause the liberation of a greater number of secondary electrons than the number of incident primary electrons, projecting said secondary electrons onto an electron mirror for reflecting the secondary electron image past the secondary emitting electrode and accelerating and focussing the secondary electrons onto a further electrode.

The invention also provides improved apparatus for the amplification of electron images according to the embodiments of the invention and also provides improved electron discharge devices designed to operate in accordance with the methods according to the invention.

It will be appreciated that by the use of "plain" or continuous secondary emitting electrodes it is possible to avoid the difficulty due to the finite structure of the grids such as have been employed in previous proposals and the provision of the electron mirrors permits of the primary or secondary electrons, as the case may be, to be reflected past the secondary emitting electrode or the secondary electrons being reflected past the secondary emitting electrode so that the electrons can proceed in their travel either to a further secondary electron emitting electrode or to a further electrode on which the amplified image is utilised, such further electrode being of any suitable form, such for example as a mosaic screen, which is scanned to produce picture signals for television transmission or a screen adapted to be rendered luminous when electrons impinge thereon. The invention permits of the use of one or more secondary emitting electrodes which are arranged parallel with one another and with the electrode which emits the original electron image and with the final electrode, thus enabling a symmetrical construction of electron discharge device to be employed.

An advantage arising from the use of an electron mirror is the fact it is possible by a suitable choice of the equipotential surfaces forming the mirror to correct to some extent chromatic aberration arising from the emission velocities of the secondary electrons.

In order that the said invention may be clearly understood and readily carried into effect, it will now be more fully described with reference to the accompanying diagrammatic drawing in which:

Figure 1 illustrates one embodiment of the invention,

Figure 2 illustrates a further embodiment, and

Figure 3 is an explanatory diagram.

Referring now to Figure 1 of the drawing, there is illustrated diagrammatically an electron discharge device according to the invention and suitable for use for the generation of television signals. The reference numeral 4 indicates a photo-sensitive cathode upon which an optical image is projected through an optical lens indicated diagrammatically at 5. Arranged parallel to the cathode is a secondary electron emitting electrode 6 and parallel to the electrode 6 is a further secondary electron emitting electrode 7 and parallel to the electrode 7 is a mosaic screen 8. The mosaic screen 8 is arranged to be scanned to generate picture signals by an electron beam generated from an electron gun 9 of known form, the beam being deflected over the screen 8 by a suitable deflecting field generated electrostatically or electromagnetically, as shown by coils 10. The mosaic screen 8 may be of any suitable form, such as one which is arranged to store electrostatic charges according to the intensity of the electron image projected thereon as hereinafter referred to. Many other forms of screens from which signals suitable for television purposes can be obtained may be used in place of the usual construction of mosaic screen. In the arrangement shown the mosaic screen is of the electrostatic storage type, and on scanning the screen with an electron beam from the gun 9 the charges are restored to a datum potential and picture signals are generated across a resistance 11 which may be fed to suitable amplifiers prior to transmission. Between the cathode 4 and electrode 6 are arranged a pair of cylindrical electrodes 12 and 13 and between the electrode 6 and the electrode 7 a further pair of cylindrical electrodes 14 and 15 are arranged, whilst between the electrode 7 and screen 8 two further cylindrical electrodes 16 and 17 are provided. The cylindrical electrodes are arranged co-axially, as shown, and the whole electrode structure so far described is enclosed within an evacuated envelope 18. In the example shown in Figure 1, the device is illustrated with two stages of electron multiplication, but obviously only one stage may be employed, or more than two stages may be used, if required. The electrodes 12 and 13 serve to focus and accelerate the photo-electrons emitted by the cathode 4 onto the surface of the electrode 6 which is remote from the cathode 4, the trajectories of some of the photo electrons liberated from the cathode being indicated by the line 19. It will be seen that both the electrodes 6 and 7 have central apertures as shown, through which electrons can pass, but apart from these apertures the secondary emitting surfaces of the electrodes are plain or continuous so as to avoid the difficulty due to grid structures hereinbefore referred to. The electrons are caused to follow the trajectory 19 by the formation of an electron mirror between the electrodes 14 and 15 so that after the electrons have passed through the aperture in electrode 6 they are reflected by the mirror back onto the surface of the electrode 6 remote from the cathode 4, as shown. After the electrons have been reflected onto the surface of the electrode 6 the electron mirror is rendered ineffective and an electron lens is brought into operation for the purpose of focussing and accelerating the secondary electrons liberated from the electrode 6. These secondary electrons are projected through the aperture in the electrode 7 and onto the surface of the electrode 7 remote from the surface of the electrode 6 from which the necessary elecrons are liberated. The secondary electrons are reflected onto the electrode 7 by the formation of an electron mirror between the electrodes 16 and 17 and follow the trajectory indicated at 20 and subsequently the electron mirror is rendered ineffective and an electron lens is brought into operation whereby the electron image emitted by the electrode 7 is accelerated and focussed onto the screen 8.

It is known that an electron mirror can be established by providing in the path of electrons after acceleration an equi-potential surface having a potential corresponding to or even lower than that of zero velocity of the electrons. Both the primary and most of the secondary electrons emitted by the electrodes 4, 6 and 7 are released with emission velocities which range from zero to values of a few volts and consequently electron mirrors can be provided in the region of the electrodes 14, 15, 16 and 17 by the formation of an equi-potential surface having zero or a small negative potential difference with respect to the potential of the source of primary and secondary electrons respectively. In the example shown in Figure 1 not only do the electrodes 14, 15, 16 and 17 serve to provide according to their potentials the required electron mirrors, but also provide by varying their potentials the necessary electron lenses for the purpose above referred to. The electrodes 6, 7, 12, 13, 14, 15, 16 and 17 are connected, as shown, to a potentiometer 21 bridged across a source of potential 22. In one example the cathode 4 may be maintained at zero potential for which it is earthed as shown, the electrode 12 at a postitve potential of 5 volts, the electrode 13 at a positive potential of 30 volts, the electrode 6 at a positive potential of 300 volts, the electrode 14 at a positive potential of 305 volts, the electrode 15 at a positive potential of 330 volts, the electrode 7 at a positive potential of 600 volts, the electrode 16 at a positive potential of 605 volts and the electrode 17 at a positive potential of 630 volts. With these potentials the electrodes function to accelerate and focus the primary and secondary electrons, the electrodes therefore serving to produce electron lenses. For the purpose of changing the electron lenses between the electrodes 6 and 7 and the electrode 7 and screen 8 at the appropriate times into the electron mirrors the potentials applied to the electrodes 15 and 17 are changed, that is to say, their potentials are reduced in order to afford the zero equipotential surfaces necessary for the production of the mirrors. For example, the electrode 15 may be reduced to a potential of about —400 volts and the electrode 17 reduced to a potential of —100 volts. The actual potential depends on the penetration of the field from the next electrode, i. e. if the electrodes 15 and 17 are made longer, their potentials need not be so low. In the example shown the potentials of the electrodes 15 and 17 are changed by the application thereto of pulses of suitable amplitude and phase and these pulses may be supplied from a pulse generator 23 through a delay network 24 so that the the electron mirrors are established at the appropriate times and subsequently the mirrors are rendered ineffective by the substitution of electron lenses. If desired, of course, the electrodes 15 and 17 may be normally maintained at the low potentials necessary to establish the electron mirrors, and the pulses which are applied thereto are employed to convert the mirrors into lenses.

For the proper functioning of the device it is necessary to interrupt the flow of primary or photo-electrons from the cathode 4 whilst the electron lens at the electrodes 14 and 15 is in operation and likewise the flow of secondary electrons from the electrode 6 should be interrupted whilst the electron lens between the electrodes 16 and 17 and screen 8 is in operation. This interruption of the flow of electrons may be effected at the appropriate times by the application of suitable alternating potentials to the appropriate electrodes of the device, for example the electrodes 12 or 13 and 14 or 15, the period of the alternating potentials corresponding to the time of flight of the electrons through the device. If desired the electrodes 12 and 13 may be combined. The alternating potentials for interrupting the flow of electrons and the potentials which are applied to the electrodes for converting the electron mirrors into lenses or vice versa are preferably in the form of square topped pulses, the potentials for causing cessation of the flow of electrons being also preferably supplied from the generator 23. It is desirable to ensure that the cessation of photo-electrons and the cessation of secondary electrons occurs instantaneously in order to avoid loss of focus. Obviously, if desired, the required pulses or potentials necessary for the cessation of the flow of electrons and the conversion of the mirrors into lenses or vice versa may be supplied directly from high frequency oscillators.

In the drawing it will be observed that the optical image is projected on only a part of the photo-sensitive cathode 4 such an arrangement being desirable in order to avoid the apertures in the electrodes 6 and 7 being visible in the resultant picture.

The invention is not limited in its use to television transmission systems since it is possible to replace the screen 8 by a screen adapted to be rendered luminous under the impact of electrons to enable the amplifier to be employed as an electron telescope or microscope or for other purposes. By suitable choice of the screen the device may be employed as a light transformer and for other purposes.

In a further example of the invention as shown in Figure 2 of the drawing, a construction is employed in which it is not necessary to apply alternating potentials to the electrodes since the electron mirror is so arranged that the photo-electrons impinge on the surface of the first secondary emitting electrode facing the photo-sensitive cathode and the secondaries are accelerated therefrom towards the electron mirror from whence they are reflected through the aperture in the secondary emitting electrode. In the multiplier shown in Figure 2 only one stage of multiplication is shown, but obviously more than one stage may be employed. In this figure the reference numeral 25 indicates a photo-sensitive cathode upon which an optical image is cast through an optical lens indicated at 26. The photo-electrons are caused to impinge on a plain secondary electron emitting electrode 27 having a central aperture and between the cathode 25 and the electrode 27 electrodes are arranged which, due to their potentials, form simultaneously an electron lens for the photo-electrons and an electron mirror for the secondary electrons. The electrode 27 is apertured and secondary electrons from the electrode 27 are accelerated towards the mirror and are there reflected and pass through the aperture in the electrode 27 and focussed on to a mosaic screen 28 or other suitable screen as described in connection with Figure 1. Between the cathode 25 and electrode 27 three co-axial cylindrical electrodes 29, 30 and 31 are arranged, the first electrode 29 being maintained for example at zero potential, the electrode 30 at a positive potential of 200, the electrode 31 at a positive potential of 400 volts and the electrode 27 may be arranged at a positive potential of 300 volts. The potentials applied to the electrodes 29, 30 and 31 cause the photo-electrons to be accelerated and focussed onto the electrode 27 with a velocity such as to cause the liberation of a greater number of secondary electrons. The potentials applied to the electrodes 30 and 31 cause, so far as the secondary electrons are concerned, the production of an electron mirror, the equi-potential surfaces of which are shown diagrammatically in the figure. Since the electrode 27 on which the photo-electrons impinge is at a positive potential of 300 volts with respect to the source of electrons, the photo-electrons impinge on this surface with a velocity of 300 volts, the path of some of the photo-electrons being indicated by the dotted line 32. Since the electrode 31 is 100 volts more positive than the electrode 27, the secondary electrons liberated from the electrode 27 are accelerated towards the electron mirror and are there reflected and focussed through the aperture in the electrode 27. Between the electrode 27 and the screen 28 further cylindrical co-axial electrodes 34 and 35 are provided, the electrode 34 being maintained, for example, at a positive potential of 400 volts and the electrode 35 at a positive potential of about 600 volts. These two electrodes serve to accelerate and focus the secondary electrons passing through the electrode 27 on the screen 28. The electrode structure is arranged in the evacuated housing 36 and the screen 28 is arranged to be scanned by the electron gun 37 as described in connection with Figure 1. The required potentials for the electrodes may be derived from a potentiometer similar to that shown in Figure 1.

Figure 3 of the drawing is a diagram for the purpose of explaining the reason why the secondary electrons when reflected by the mirror will be caused to pass through the aperture in the electrode 27. Since the electrode 27 is maintained as stated above at a positive potential of about 300 volts, i. e., at the same potential as the equi-potential surface which causes reflection, it would appear at first sight that no acceleration of the electrons past the electrode 27 will result. As shown in Figure 3 of the drawing, if two electrodes A and B are maintained at the same potential, for example, at 100 volts, and an apertured diaphragm C is maintained at zero potential, then the equi-potential surfaces between the electrodes A and B will be somewhat as shown in the figure. In the drawing a few of the equi-potential surfaces are shown which are indicated at 20, 40, 60, and 80, these figures corresponding to the potentials of the surfaces. For simplicity the potential origin has been changed so that the electrons under consideration originate at the potential of the electrode C which is zero. It will be seen from the figure that the equi-potential surfaces cross one another in the centre of the aperture so that although the electrode C may be at zero volts, nevertheless, in the centre of the aperture a region of positive potential occurs which is indicated at the intersection of the equi-potential surfaces 40, such surfaces representing in the example shown 40 volts. The equi-potential surfaces adjacent the electrode 27 of Figure 2 will be somewhat similar to the surfaces shown in Figure 3 and hence in the centre of the aperture in the electrode 27 a region of potential more positive than the potential applied to the electrode 27 will occur so that the secondary electrons when reflected by the mirror will be accelerated towards this central region and will thus pass through the aperture and will then be accelerated by the still more positive electrode 34.

It is possible so to design the mirror that some degree of correction can be made for chromatic aberration arising from the emission velocities of the secondary electrons.

In the examples of the invention described it may, in some cases, be advisable to employ in place of, or in addition to, the electrostatic focussing electrodes, electromagnetic coils for focussing purposes. With the arrangement shown in Figure 1 the electrodes 6 and 7 may be concavely curved with respect to the direction at which the electrons impinge and the electrode 27 of Figure 2 may be concavely curved towards the cathode 25 for the purpose of correcting for the field curvature of the electron image and for directing, in the case of the electrode 27, the secondary electrons towards the centre of the electron mirror. Other shapes of electrodes may be used to reduce aberrations such as spherical aberration. If desired, two images may be simultaneously cast on the cathode 4 or 25, such as on the upper and lower halves of the cathodes whereby a stereoscopic image may be viewed on the final screen through a suitable stereoscopic device.

Where the invention is applied to picture amplifiers for use in television systems, the mosaic screen may be either of the single-sided type—in which case it is scanned from the same side to that on which the image is projected—or, alternatively, it may be of the double-sided type, in which case it can be scanned from the opposite side.

The invention is, of course, not limited in its use to television transmission as it may be employed for other purposes.

We claim:

1. A method of amplifying an electron image of an object which comprises projecting the electron image past a plain secondary electron emitting electrode, producing an electron mirror and reflecting the electron image back onto the surface of the secondary emitting electrode with a velocity such as to cause the liberation of a greater number of secondary electrons than incident primary electrons, removing the electron mirror and subjecting the released secondary electrons to the action of an electron lens whereby the secondary electrons are accelerated and focussed onto a further electrode.

2. An apparatus for amplifying an electron image of an object comprising an electron discharge device having a light responsive electrode adapted to emit an electron image of an optical image projected thereon, a plurality of cylindrical electrodes, means for accelerating and directing the electron image onto a secondary electron emitting electrode with a velocity such as to cause the liberation of a greater number of secondary electrons than incident primary electrons, and means including said cylindrical electrodes and a source of potential for cyclically altering the potentials applied to said cylindrical electrodes so that the resultant electrostatic field may form alternately an electron mirror and an electron lens whereby the trajectories of the electrons may be sequentially changed so as to cause them to follow a desired path.

3. Apparatus for amplifying an electron image of an object comprising an electron discharge device having a light responsive electrode adapted to emit an electron image when an optical image is projected thereon, means for projecting and accelerating said electron image past a secondary electron emitting electrode, an electrode system and a source of potential for applying suitable potentials to said electrode system for the production of an electron mirror whereby said electron image is reflected by said mirror back onto the surface of the secondary emitting electrode remote from the surface of the electrode which emits the original electron image and means including a variable source of potential connected to said electrode system for periodically removing the electron mirror and for substituting an electron lens for the purpose of focussing and accelerating the secondary electrons released from said secondary electron emitting electrode onto a further electrode.

4. Apparatus according to claim 3 wherein the secondary electron emitting electrode has an aperture and the arrangement is such that the primary electrons are initially projected through said aperture prior to reflection onto the side of the secondary emitting electrode remote from the electrode which emits the original electron image.

5. Apparatus according to claim 3 wherein means are provided for causing the cessation of flow of primary electrons during the period that the secondary electrons are being focussed onto said further electrode.

6. Apparatus according to claim 3 wherein the electrode system which forms the electron mirror is utilised to form the electron lens for focussing the secondary electrons emitted by said secondary electron emitting electrode and means are provided for changing the potentials applied to said electrode system whereby according to the potentials applied to said system the latter forms either an electron mirror or an electron lens, means being provided for causing the cessation of flow of primary electrons during the period that the secondary electrons are being focussed onto said further electrode.

7. An electron discharge device comprising an electrode adapted to emit an electronic current image of an optical image, a secondary electron emitting electrode spaced therefrom, means including a source of potential for focusing and accelerating the electronic current image past the secondary electron emitting electrode, an electron-optical system including potential means for forming the electron mirror for reflecting the primary electrons after having passed the secondary emitting electrode onto the side of the secondary electron emitting electrode remote from the electrode which emits the original electronic current image, variable potential means connected to said electron-optical system for converting the electron mirror into an electron lens to focus the secondary electrons liberated from the secondary electron emitting electrode, and a further electrode on which said secondary electrons are focused and projected.

8. An electron discharge device according to claim 7, wherein the said electron-optical system comprises a plurality of electrodes capable of producing either the electron mirror or the electron lens according to the potentials applied to the electrodes.

9. An electron discharge device according to claim 7, wherein the secondary electron emitting electrode is apertured and the arrangement is such that the primary electrons can be caused to pass through said aperture where they are reflected by the electron mirror which is disposed on the side of the secondary electron emitting electrode remote from the electrode which emits the original image.

10. Apparatus according to claim 2 wherein the electrode which is designed to emit an electron image of an optical image and the secondary electron emitting electrode are arranged substantially parallel to one another and the cylindrical electrodes which form the electron mirror or the electron lens are symmetrically arranged with respect to the electrode which emits the electron image of the object and said secondary electron emitting electrode.

11. An electron discharge device according to claim 7, wherein the electrode which is designed to emit an electronic current image of an optical image and the secondary electron emitting electrode are arranged substantially parallel to one another and the electrodes which form the electron mirror or the electron lens are symmetrically arranged with respect to the electrode which emits the electronic current image and said secondary electron emitting electrode.

HANS GERHARD LUBSZYNSKI.
WILLIAM STEWART BROWN.